May 5, 1959 S. J. NALBONE ET AL 2,884,877
SPREADER OPERATING MECHANISM FOR BUTTER OR THE LIKE
Filed April 24, 1956
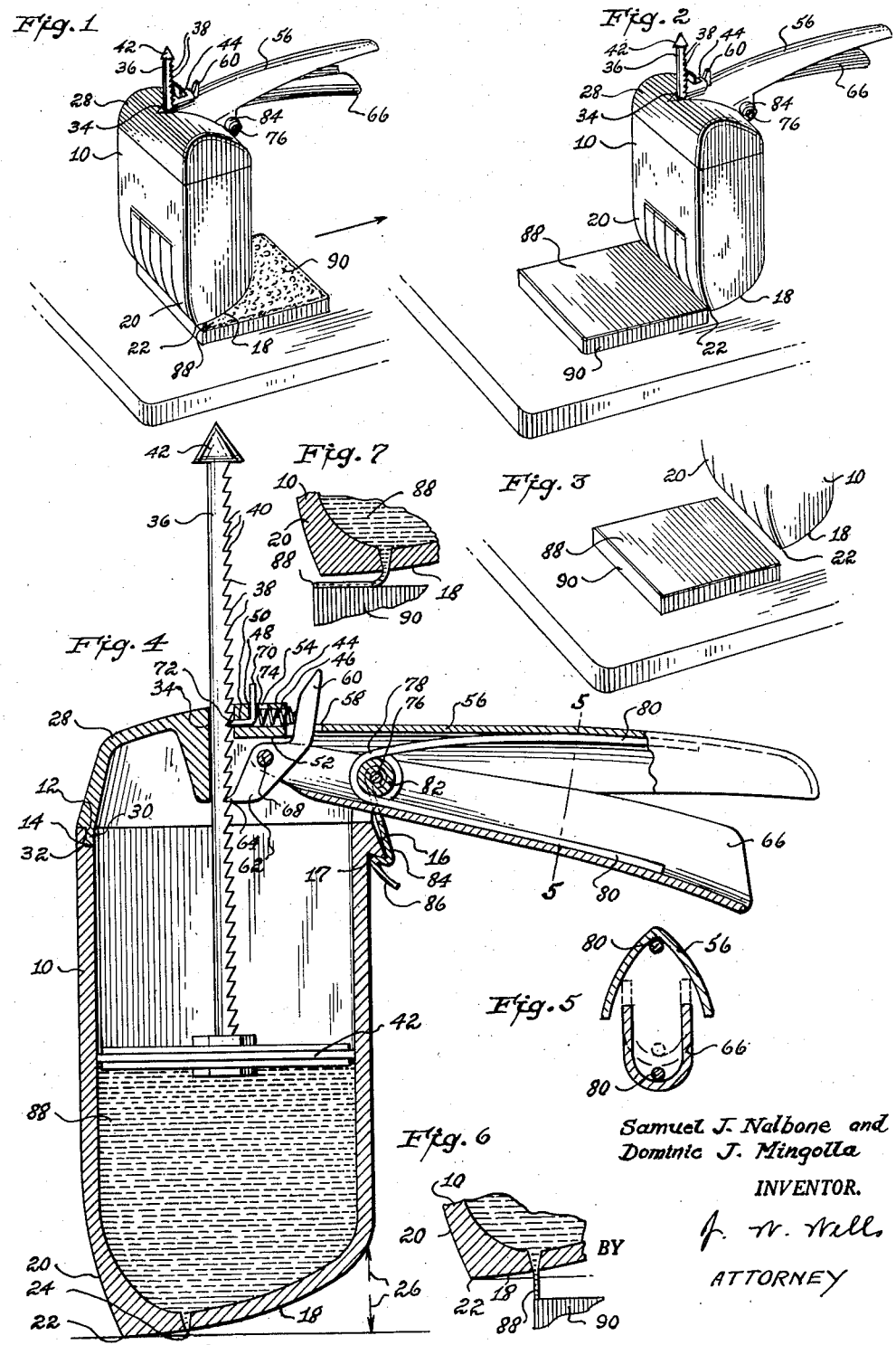
Samuel J. Nalbone and
Dominic J. Mingolla
INVENTOR.
BY
ATTORNEY

United States Patent Office 2,884,877
Patented May 5, 1959

2,884,877

SPREADER OPERATING MECHANISM FOR BUTTER OR THE LIKE

Samuel J. Nalbone, Trenton, N.J., and Dominic J. Mingolla, Huntingdon Valley, Pa.

Application April 24, 1956, Serial No. 580,300

3 Claims. (Cl. 107—52)

This invention relates to a portable and manually operated spreader for butter, cheese, jelly, peanut butter or other substances of similar consistency, the device or machine including a cylinder or receptacle into which a block of butter may be inserted, and a piston actuated by a rack and pawl assembly for forcing the butter from the receptacle through an outlet in the bottom of the container.

One of the principal objects of the present invention is to provide a device of the general character mentioned by means of which a predetermined quantity of butter or the like may be spread in a relatively thin layer upon the entire surface of a slice of bread, in successive cycles of operation. This result is effected by the combination of special cooperative means within the operating elements for positively limiting the quantity of butter discharged from the container, and a narrow slot in the bottom of the container of a length corresponding to the width of a slice of bread, the area of the slot being such as to extrude precisely the quantity of butter required to cover the entire surface of the slice in one manual operation of the spreader.

The operating elements referred to include a rigid handle carried by a removable cover for the butter receptacle, a trigger member pivotally connected to the handle, a pawl carried by the end of the trigger member for engagement with the teeth of the rack which carries the piston and a latch for preventing reverse movement of the rack. Another object of the present invention is to provide a more efficient and simplified pawl and latch assembly in which a single spring cooperatively controls the action of both the pawl and the latch.

Another, and important, object of this invention is to provide the bottom of the butter container with a forwardly inclined surface by means of which the butter can easily be spread without coming into contact with the surface of the spreader.

A further object of the invention is to provide the rear end of the inclined surface with a cutting edge extending entirely across the rear of the receptacle which may be utilized for the double purpose of cutting off the layer of butter at the rear edge of the slice of bread after its surface has been covered with butter and also to smooth out warm butter over the surface of the bread in an even layer.

A still further object of this invention is to provide the inclined bottom surface of the receptacle with a convex formation for smoothing out a layer of cold butter or other substance extruded from the slot in the bottom of the container over a slice of bread or other surface.

A particular advantage of our invention resides in the facility which it affords of applying an adequate layer of butter to a slice of bread with the use of a minimum quantity of butter, not only in homes but also in hotels and restaurants, with a substantial saving over previous methods of spreading butter on bread in the cost of the butter required.

Other objects and advantages of our invention will be apparent from the following specification and reference to the accompanying drawing, in which:

Fig. 1 is a perspective view of one embodiment of our invention illustrated at the beginning of the operation of spreading a layer of butter on a slice of bread;

Fig. 2 is a similar view illustrating the completion of the spreading operation;

Fig. 3 is a detail view showing a slice of bread and the machine after the spreading operation has been completed;

Fig. 4 is a sectional view of the spreading machine shown in Figs. 1, 2 and 3;

Fig. 5 is a cross-sectional view taken on the line 5—5 of Fig. 4;

Fig. 6 is a detail sectional view showing the beginning of the operation of spreading a layer of butter on a slice of bread; and Fig. 7 is a view similar to Fig. 6 but showing the progress of the operation of spreading a layer of cold butter on a slice of bread.

Referring to the drawings in which like numerals designate like parts or elements in the several views, it should be noted that in Figs. 4, 6, and 7 the substance to be spread is indicated as a liquid in view of the fact that the substance contemplated to be spread by our improved machine is capable of flowing, whether it be cold or warm butter, cheese, jelly or the like.

The spreading machine includes a receptacle 10 of rectangular cross-section adapted to receive a block or two half blocks of butter of conventional form, as generally sold in food stores. The receptacle is provided in the front of its top open end with a recess 12 having an inwardly facing groove 14 and at its rear with an outwardly projecting and downwardly diverging shoulder 16, the bottom edge 17 of which is slightly undercut in an upward direction to form a hook. The bottom surface 18 of the receptacle is inclined from the front to the rear, and preferably of convex formation. The front outer surface of the receptacle is slightly curved inwardly as shown at 20, and this surface joins the bottom surface to provide a relatively sharp edge 22. The inner walls of the receptacle are also curved toward a narrow slot 24 which is enlarged at its inner side and converging into the outer curved surface 18. As indicated by the arrows 26, the rear wall of the receptacle is substantially higher relative to a horizontal surface than the edge 22, when the device is in operating position.

A cover 28 is provided at its front edge with a downwardly projecting skirt 30 adapted to fit in the recess 12 and also provided with a beaded projection 32 adapted to fit in the groove 14. The cover 28 is also provided with a central opening 34 through which projects a rack 36 provided with upwardly diverging teeth 38 terminating in horizontal faces 40. Connected to the lower end of the rack 36 is a piston 42 closely fitting within the receptacle 10. The top of the rack 36 may be provided with a knob 42 or other suitable handle. The rear side of the cover 28 is partially cut away but provided with an integral horizontal guide portion 44 in which is a bore 46 extending from its rear end to a point shortly distant from the central opening 34 where it terminates in a vertical shoulder 48. A horizontal flat slot 50 extends inwardly from the shoulder 48 to the central opening 34. The bottom side 52 of the guide portion 48 serves as a stop to limit upward movement of a pawl carried by a trigger lever to be described. A short vertical slot 54 in the upper edge of the bore 46 extends rearwardly from the shoulder 48 to a point intermediate of the ends of the guide portion.

A handle 56 is formed integrally with, or rigidly secured to, the top of the cover 28. A slot 58 is formed in the upper portion of the handle, and through this slot projects an arm 60 formed on a pawl 62 which has a projecting front edge 64 for engagement with the teeth 38 of the rack 36. The pawl 64 is pivotally mounted on the end of a trigger lever 66 on a cross-pin 68. An L-shaped lock member 70 is vertically and slidably mounted in the guide portion 44 with its horizontal portion in the flat slot 50 and its vertical portion in the slot 54. The outer end of the horizontal portion of the lock member 70 is downwardly inclined, as indicated at 72 to form a thin edge for engagement with the teeth 38 of the rack 36 in such a manner as to prevent movement of the rack in a reverse direction from the movement effected by the pawl 62.

A helical spring 74 is disposed in the bore 46 of guide portion 44 between the vertical portion of the L-shaped latch member 70 and the arm 60 of the pawl 62. This spring, being under compression, functions to hold the pawl 62 and the latch member 70 in engagement with the teeth of the rack 36.

After the plunger 42 has been forced downwardly to the limit of its stroke, the operator can instantly return it to its upper, starting position by manually pressing the arm 60 of the pawl 64 and the vertical leg of the lock member 70 toward each other, thereby simultaneously releasing the pawl and the lock member from the teeth 38 of the rack 36. Then the operator with his free hand can easily and quickly withdraw the piston upwardly until it is stopped by abutment with the cover 28. The cover may then be unlatched and removed, a new block, or pat of butter inserted into the cylinder, and the cover replaced on the receptacle 10, leaving the spreader in condition for another cycle of spreading operations. This greatly expedites the operation of spreading butter on a large number of slices of bread.

The trigger member 66 is pivotally mounted on the rigid handle 56 by means of a cross-pin 76. The handle 56 is formed with inverted flaring walls, in cross-section; and the trigger lever 66 is U-shaped and of lesser width than that of the handle 56. As more clearly shown in Fig. 5, the trigger lever is positioned centrally below the handle member so that the edges of the trigger member are in position to abut the flaring inner walls of the handle and thus limit the upward movement of the trigger lever. The width of the trigger lever is so proportioned in relation to the plane of contact against the flaring walls of the handle, also in relation to the location of the pivot pin 76 and the spacing of the rack teeth 38 that the pawl 60 will move the rack 36 toward the container 10 a distance equal to the length of one tooth when the trigger lever is moved from normal tooth engagement of the pawl until the edges of the trigger lever come into contact with the handle. A return bent spring 78 is coiled about the cross-pin with its free end portions 80 engaging the inner walls of the handle and trigger members 56 and 66, as shown in Fig. 4, for normally holding them apart from each other. A sleeve 82 may be mounted on the cross-pin and the spring coiled about the sleeve. A resilient latch member 84 having two arms pivotally mounted on the cross-pin 76 on opposite sides of the handle has hook 86 formed on its lower end for engagement with the hooked shoulder 16 of the container 10. When the beaded projection 32 of the cover 28 is inserted in the groove 14 and the hook 86 is snapped into engagement with the shoulder 16, the cover will be firmly but detachably secured in position on the container.

The outlet of the slot 24, in the bottom of the container 10, is so proportioned in relation to the spacing of the rack teeth 38 that the downward movement of the piston 42 against a compact quantity of butter or the like 88 in the container a distance equal to the length of one rack tooth will extrude through the slot a ribbon of butter or other extrudable substance of predetermined thickness, length and width, so that in one operation of the trigger lever 66 a thin ribbon of butter of an area suitable for covering a slice of bread, for example, may be extruded from the supply of butter in the container. Successive cycles of operation will effect the same result for as many slices of bread as it may be desired to cover. Moreover, the user can accurately determine the number of slices that can be buttered with one filling of the container.

As previously mentioned the container 10 is designed to receive a block or two half blocks of commercially prepared butter, but it can be filled with butter or other substance sold in bulk quantities.

In spreading a layer of butter on a slice of bread, for example, the user proceeds as illustrated in Figs. 1, 2 and 3, moving the spreader backwards and gently squeezing the trigger lever 66, thus causing a thin ribbon of butter 88 to be extruded from the slot 24. This ribbon of butter is discharged against the front edge of a slice of bread 90, as indicated in Fig. 6. If the butter is cold it can be folded over the surface of the bread without permitting the bottom surface of the container to drag along the surface of the butter, as indicated in Fig. 7. After the edge 22 of the spreader reaches the rear edge of the slice of bread it is lowered to shear off the layer of butter, thus leaving the buttered bread, as shown in Fig. 3.

Our improved spreader not only insures a substantial saving in the use of butter or other substance in spreading but it also greatly facilitates the buttering of bread and the like, thus effecting the saving of much time of workers in the kitchens of hotels and restaurants, since the spreading operation with our spreader is very simple and speedy. If the butter or other substance is warm, the layer can be smoothed out by passing the edge 22 of the container over it. The cover 28, together with the rack 36 and piston 42, is easily removed from the container 10 after the latch 84 is unfastened. The container and cover can then easily be cleaned by scalding or other suitable means. The operating parts are simple and inexpensive in construction, thus rendering it possible to supply spreaders of our improved construction to homes at a reasonable cost. The container, cover and other parts of our improved spreader may be made of metal, plastic or other suitable materials.

Obviously various changes in the construction of our improved spreader may be made within the scope of our invention. Therefore, it should be understood that the embodiment of our invention shown and described is intended to be illustrative only, and not limited to such details of construction.

We claim:

1. In a butter spreader including a butter receptacle having a removable cover and a piston in said receptacle carried by a toothed rack extending through a central opening in said cover and in normally slidable relation therewith, said receptacle having a discharge outlet for butter forced from said receptacle, a horizontally and rearwardly extending handle rigidly carried by said cover, a trigger lever pivotally connected to the front end of said handle, a pawl pivotally connected to the front end of said lever and engaging the teeth of said rack for forcing said rack and piston into said receptacle, a latch member slidably mounted in said cover and in engagement with said teeth to prevent reverse movement of said rack, spring means in said cover between and in engagement with said pawl and latch member holding both in engagement with the teeth of said rack, said pawl and latch member being provided with manually cooperable means for simultaneously releasing them from engagement with the teeth of said rack.

2. A butter spreader as claimed in claim 1 in which the manually cooperable means for simultaneously releasing said pawl and latch member from the teeth of said rack consist of a substantially vertical portion on said pawl and on said latch member, and in which the spring means in said cover consists of a helical spring between said substantially vertical portions urging them apart, and thereby urging said pawl and latch member into engagement with the teeth of said rack.

3. A butter spreader as claimed in claim 2 in which said latch member is L-shaped with a horizontal portion in engagement with the teeth of the rack and its other portion substantially vertical, in which the latch member is slidably mounted in said cover and in which the pawl pivotally mounted in said cover is provided with a substantially vertical portion opposed to the vertical portion of said latch member and in which a helical spring is interposed between the substantially vertical portions of said pawl and latch member urging said substantially vertical portions apart and thereby urging said pawl and latch member into engagement with the teeth of said rack.

References Cited in the file of this patent

UNITED STATES PATENTS

| | | |
|---|---|---|
| 783,963 | Kennedy | Feb. 28, 1905 |
| 1,427,411 | Payne | Aug. 29, 1922 |
| 1,976,253 | Clark | Oct. 9, 1934 |
| 2,008,636 | Brynan | July 16, 1935 |
| 2,197,579 | Hooper | Apr. 16, 1940 |
| 2,234,432 | Gallo | Mar. 11, 1941 |
| 2,634,692 | Sherbondy | Apr. 14, 1953 |
| 2,670,881 | Sjoblom | Mar. 2, 1954 |

FOREIGN PATENTS

| | | |
|---|---|---|
| 42,238 | Netherlands | July 15, 1937 |